(12) United States Patent
Bertossi

(10) Patent No.: US 11,938,882 B2
(45) Date of Patent: Mar. 26, 2024

(54) SIDE AIRBAG PACKAGED IN SIDE OF SEAT

(71) Applicant: ZF Passive Safety Systems US Inc., Washington, MI (US)

(72) Inventor: Rico Scott Bertossi, Kenockee, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 38 days.

(21) Appl. No.: 17/224,202

(22) Filed: Apr. 7, 2021

(65) Prior Publication Data

US 2022/0324404 A1    Oct. 13, 2022

(51) Int. Cl.
*B60R 21/207* (2006.01)
*B60R 21/0136* (2006.01)
*B60R 21/231* (2011.01)
*B60R 21/2342* (2011.01)
*B60R 21/237* (2006.01)
*B60R 21/00* (2006.01)
*B60R 21/01* (2006.01)

(52) U.S. Cl.
CPC ........ *B60R 21/207* (2013.01); *B60R 21/0136* (2013.01); *B60R 21/23138* (2013.01); *B60R 21/2342* (2013.01); *B60R 21/237* (2013.01); *B60R 2021/0044* (2013.01); *B60R 2021/0048* (2013.01); *B60R 2021/0055* (2013.01); *B60R 2021/0058* (2013.01); *B60R 2021/01013* (2013.01); *B60R 2021/2076* (2013.01); *B60R 2021/23146* (2013.01)

(58) Field of Classification Search
CPC .............. B60R 21/207; B60R 21/0136; B60R 21/23138; B60R 21/2342; B60R 21/237; B60R 2021/044; B60R 2021/0048; B60R 2021/0055; B60R 2021/0058; B60R 2021/01013; B60R 2021/2076; B60R 2021/23146
See application file for complete search history.

(56) References Cited

U.S. PATENT DOCUMENTS 5,273,309 A   12/1993  Lau et al.
5,439,248 A    8/1995  Steffens, Jr. et al.
(Continued)

FOREIGN PATENT DOCUMENTS

DE           19916850 A1 * 10/2000 ............. B60R 21/20

OTHER PUBLICATIONS

DE-19916850-A1 Machine English translation (Year: 2000).*

*Primary Examiner* — Jason D Shanske
*Assistant Examiner* — Matthew James O'Neill
(74) *Attorney, Agent, or Firm* — TAROLLI, SUNDHEIM, COVELL & TUMMINO L.L.P.

(57) ABSTRACT

An apparatus, system, and method for helping to protect occupants of a vehicle seat in the event of a collision. The vehicle seat includes a base with a bottom cushion, a backrest with a back cushion, and a side rest having a side cushion that extends upward from the bottom cushion and forward from the back cushion. The apparatus comprises a deployable restraint stored in a pre-deployment condition in the side rest. The deployable restraint comprising an airbag and an inflator for inflating and deploying the airbag. When inflated to a deployed condition the restrain cushions the occupant against impacts with the side rest.

16 Claims, 5 Drawing Sheets

(56) References Cited

U.S. PATENT DOCUMENTS

| | | | |
|---|---|---|---|
| 5,899,489 A * | 5/1999 | Jost | B60N 2/4235 |
| | | | 280/730.2 |
| 9,180,830 B1 | 11/2015 | Faruque et al. | |
| 10,053,045 B2 * | 8/2018 | Weiss | B60R 21/207 |
| 10,246,041 B2 * | 4/2019 | Kobayashi | B60R 21/23138 |
| 11,267,427 B1 * | 3/2022 | Deng | B60R 21/207 |
| 2009/0230659 A1 * | 9/2009 | Megiveron | B60R 21/0136 |
| | | | 280/730.2 |
| 2015/0076801 A1 * | 3/2015 | Fujiwara | B60R 21/239 |
| | | | 280/729 |
| 2016/0200278 A1 * | 7/2016 | Wiik | B60R 21/2342 |
| | | | 280/730.2 |
| 2020/0094771 A1 * | 3/2020 | Jost | B60R 21/015 |
| 2021/0300293 A1 * | 9/2021 | Shibahara | B60R 21/23138 |
| 2022/0063549 A1 * | 3/2022 | Kim | B60R 21/2338 |

\* cited by examiner

SIDE AIRBAG PACKAGED IN SIDE OF SEAT

TECHNICAL FIELD

The present disclosure relates generally to helping to protect occupants of a vehicle seat in the event of a collision and, more specifically, an apparatus, system, and method for protecting occupants of a vehicle equipped with seating having a side rest.

BACKGROUND

It is known to provide an inflatable vehicle occupant protection device, such as an airbag, for helping to protect an occupant of a vehicle. One particular type of airbag is a side airbag inflatable between an occupant of a seat and a side structure, such as an inner trim panel or door, of the vehicle. Side airbags can be driver airbags or passenger airbags. When inflated, the driver and passenger side airbags help protect the occupant from impacts with parts of the vehicle such as the door frame, the window, and arm rests attached to the vehicle door.

Side airbags are typically stored in a deflated condition in a housing that is mounted either in the seat (e.g., in a seat back or seat base), or to a side structure of a vehicle, such as a door or pillar. Upon inflation and deployment of the side airbag, the housing opens under the forces exerted by the inflating airbag to permit the airbag to move to an inflated and deployed condition.

There are trends in the auto industry to make vehicles more spacious and comfortable for vehicle occupants. Styling has been making traditional seating configurations outdated in a bid for increased occupant comfort. Looking further into the future, driverless, autonomous vehicles are even more spacious. Autonomous vehicles have been contemplated for some time, and now their adaption on a large scale is approaching. Autonomous vehicles can eliminate some of the structure traditionally relied upon for supporting various vehicle safety devices and necessitate new structures for supporting various vehicle safety devices.

With these realities as a backdrop, the paradigm of occupant safety systems is shifting. In the past, the necessity of a vehicle operator/driver lent to a somewhat standard vehicle passenger cabin configuration. In the U.S., the driver is a front seat, left side, forward facing occupant within reach of the vehicle controls and instrumentation (steering wheel, pedals, instrument panel, console, etc.). This driver configuration helps dictate the layout of the remainder of the vehicle—front seat, forward-facing passenger-side occupant, rear seat (second row, third row, etc.) forward-facing occupants. Accordingly, in the past, occupant safety systems were typically designed with this passenger cabin layout and the associated occupant positions and orientations in mind.

The autonomous vehicle eliminates the operator/driver, which eliminates the necessity of their being positioned and oriented in the conventional manner. Vehicle manufacturers are free utilize passenger cabin space as they see fit without being constrained to predetermined passenger arrangements, such as all forward-facing occupants, or vehicle structural configurations, such as steering wheel/instrument panel configurations, center console configurations, foot well pedal controls, etc.

This presents the challenge of not only where to locate airbag systems, but also finding a reaction surface against which to position the airbag so that it can absorb impacts. Typically, side structures of a vehicle act as a reaction surface against which side airbags rest so that they can oppose, cushion, and absorb the impact energy of an impacting occupant and provide a desired ride-down effect. In the autonomous vehicles, however, the vehicle may include new and different internal structures, and the occupants can be positioned and oriented outside the traditional manner. This can make it difficult or impossible to utilize traditional structures in the vehicle as reaction surfaces to protect occupants.

SUMMARY

The present disclosure relates generally to helping to protect occupants of vehicles in the event of a collision and, more specifically, an apparatus, system, and method for protecting occupants of vehicle seating having a side rest arranged, for example in the manner of a couch or couch-like seat having an arm rest at one or both lateral ends.

According to one aspect, an apparatus for helping to protect occupants of a vehicle seat in the event of a collision. The vehicle seat includes a base including a bottom cushion, a backrest including a back cushion, and a side rest comprising a side cushion that extends upward above the bottom cushion and forward from the back cushion. The apparatus comprises a deployable restraint having a stored, pre-deployment condition in the side rest and the restrain is inflatable to a deployed condition in which the restraint cushions the occupant against impacts with the side rest.

According to another aspect, a system for helping to protect occupants of a vehicle seat in the event of a collision can include the apparatus, at least one crash sensor for detecting a vehicle collision event, and a controller for receiving a signal from the at least one crash sensor in response to the vehicle collision event. The controller can be configured to deploy the deployable restraint in response to receiving the signal from the crash sensor.

BRIEF DESCRIPTION OF THE DRAWINGS

The foregoing and other features of the present disclosure will become apparent to those skilled in the art to which the present disclosure relates upon reading the following description with reference to the accompanying drawings, in which.

DETAILED DESCRIPTION

The present disclosure relates generally to an apparatus, system, and method for helping to protect occupants of a vehicle in the event of a collision. One scenario where challenges to occupant protection can arise is that of autonomous vehicles, where cabin space allows for implementing non-traditional seating structures and/or arrangements. In the example configurations illustrated herein, the vehicle is equipped with non-traditional seating that includes a side rest, which gives the seat a couch-like configuration. The apparatus, system, and method are not, however, limited to an autonomous vehicle implementation. The apparatus, system, and method disclosed herein can be used to help protect occupants of a vehicle seat in any vehicle.

Referring to FIGS. 1-4C, in an example configuration, an apparatus 10 helps protect the occupant 50 of the vehicle 20. In the example configuration of FIGS. 1-4C, the vehicle 20 is an autonomous vehicle. As such, the passenger compartment or cabin is without operator controls, such as a steering wheel, pedals, instrumentation, center console, etc. Accordingly, the instrument panel is reduced in size and/or removed altogether in order to maximize the space in the cabin and vehicle seats can be in any configuration in the space, such as a couch-like seat. Control interfaces for climate controls, GPS, navigation, entertainment, etc. can, for example, be provided in a center console area of the vehicle 20 located between the passengers of the front and/or rear rows. The vehicle 20 could, however, have any other configuration, such as a conventional operator-driven vehicle that is equipped with vehicle seating having the couch-like configuration disclosed herein, such as a limousine, SUV, or a van/minivan.

Figure 1:
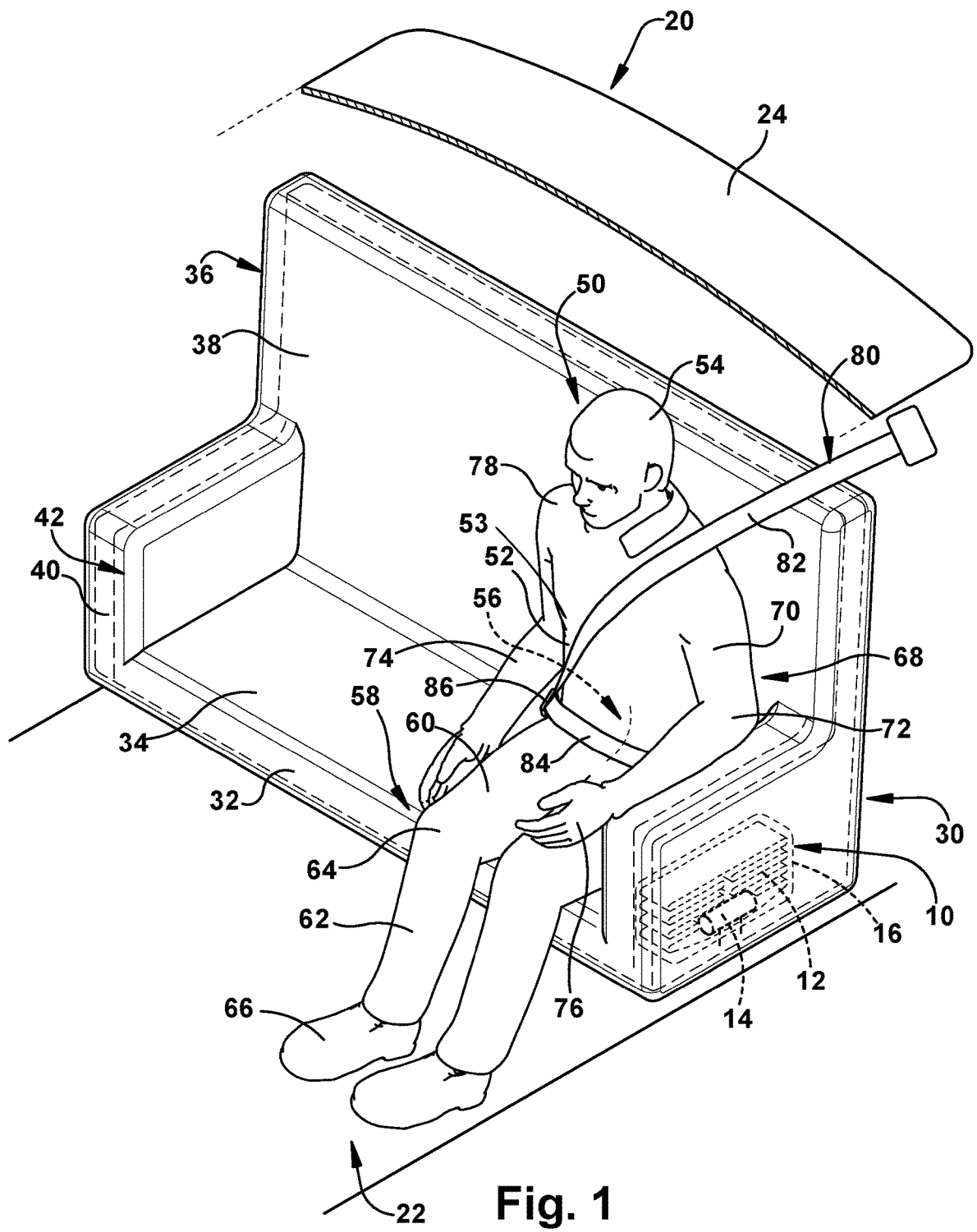
FIG. 1 is a schematic illustration of an apparatus for helping to protect an occupant of a vehicle seat in a pre-deployment condition.

Referring to FIG. 1, a vehicle 20 includes a vehicle seat 30 upon which a vehicle occupant 50 is seated. The vehicle seat 30 includes a base 32 connected to the vehicle 20, e.g., to the floor 22. The seat base 32 supports a bottom cushion 34. A backrest 36 extends upward from the bottom cushion 34 towards the vehicle roof 24. The backrest 36 includes a back cushion 38 supported by a seat frame 44. A side rest 40 includes a side cushion 42 supported by the seat frame 44. The side cushion 42 extends upward above the bottom cushion 34 and forward from the back cushion 38.

The side cushion 42 extends along a torso/thorax 52 of the occupant 50 to a predetermined height, such as one making it comfortable for the occupant 50 to rest his or her arm 74 on the side rest. In this configuration, the side rest 40 can extend up to and along a portion of the occupant's ribcage 53. As shown in FIG. 1, the side rest 40 can extend forward from the back cushion 38 to a front edge of the bottom cushion 34. The forward extent of the side rest 40 could, however, differ. The vehicle seat 30 can include a side rest 40 at one or both lateral ends of the seat 30. With the inclusion of the side rests 40, the vehicle seat 30 can thus be considered to have a couch-like configuration, with room for more than one occupant, or an armchair-like configuration, with room for only one occupant.

The occupant 50 is seated on the seat 30, with his/her torso 52 resting on the back cushion 38, head 54 positioned at or near the top of the back cushion 38, and pelvis/buttocks 56 and legs 58 (more specifically upper legs 60) resting on the bottom cushion 34. The occupant's lower legs 62 extend from the knee 64 downward toward the vehicle floor 22, where the occupant's feet 66 rest. In the typical occupant position of FIG. 1, the occupant's arms 68 are at his/her side, with the upper arms 70 adjacent and parallel to the torso 52, bent at the elbows 72 with at least one of the lower arms/forearms 74 and the corresponding hand 76 resting on the side rest 40. The other one of the lower arms/forearms 74 and corresponding hand 76 can rest on the upper legs 60. The occupant's arms 68 can, of course, be positioned differently.

As shown in FIG. 1, the occupant 50 is restrained by a seatbelt 80, which is a conventional three-point restraint including a shoulder belt portion 82 that extends from a shoulder 78 diagonally across the torso 52, and a lap belt portion 84 that extends across the occupant's lap, i.e., where the upper legs 60 meet the torso 52. The seatbelt 80 is secured via a buckle 86, which is anchored to the vehicle 20 and/or the seat 30.

The couch-like vehicle seating configuration presents additional considerations related to side impact protection. This is because the side restraint is an additional structure positioned adjacent the occupant between the occupant and any adjacent vehicle structure, such as a side structure (e.g., a vehicle pillar) or a door. Accordingly, the apparatus, system, and method disclosed herein takes into account the presence and positioning of the side rest 40 and provides occupant protection from impacts with structure adjacent the vehicle seat 30 as well as with structure adjacent the vehicle structure.

As shown in FIG. 1, the apparatus 10 is stored in the side rest 40 of the vehicle seat 30. The side rest 40 is positioned adjacent the occupant 50 and between the occupant and any adjacent vehicle structure. The side rest 40 and/or the side cushion 42 can be configured to contact at least a portion of the occupant 50, such as a lateral portion of the pelvis 56 torso 52, buttocks 56, or an upper leg 60 of the occupant or a portion of the occupant's arm 68 or hand 76.

Figure 2:
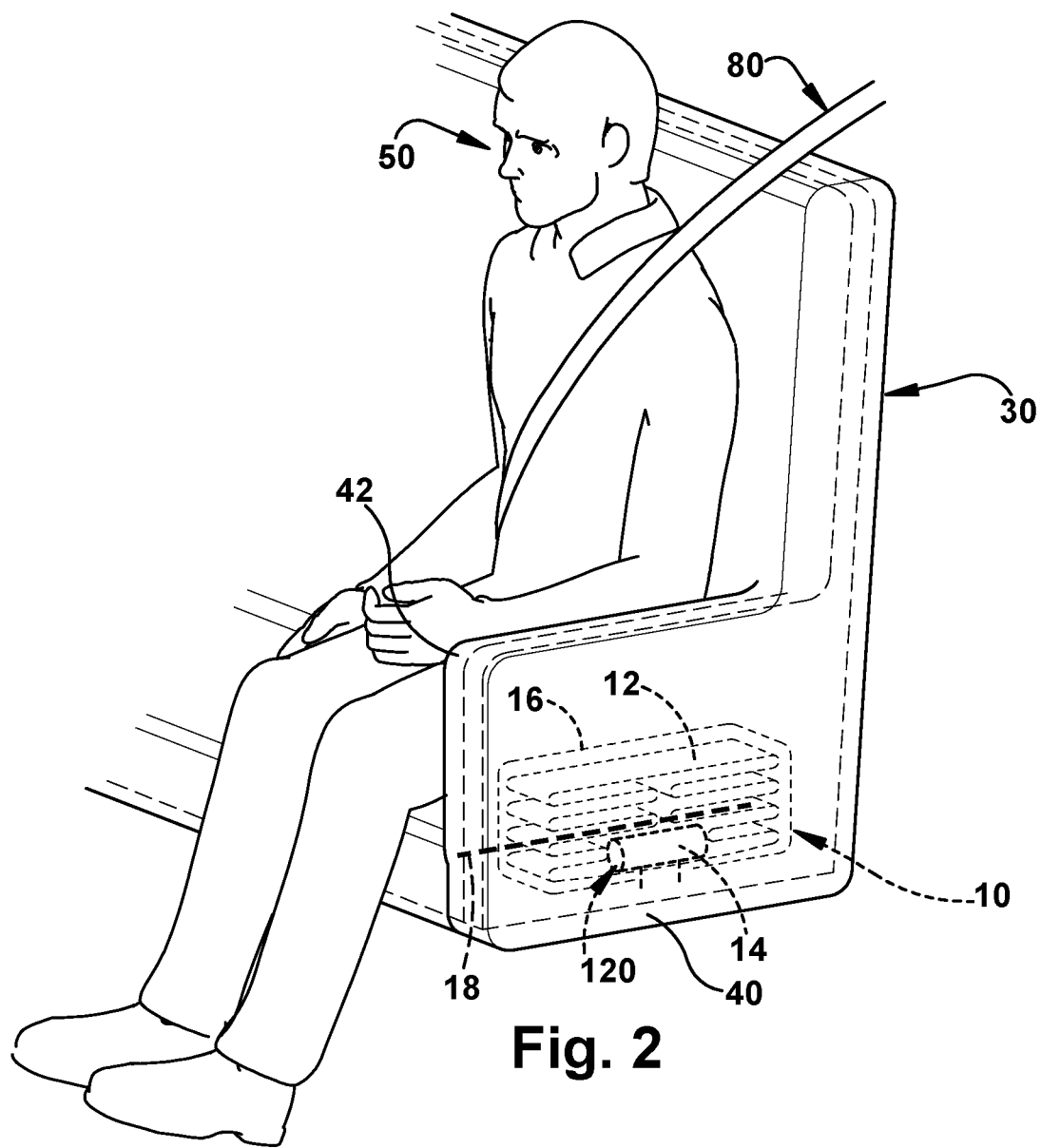
FIG. 2 is a schematic illustration of the vehicle seat and the deployable restraint of the apparatus in a pre-deployment condition.

The apparatus 10 includes a deployable restraint in the form of a side airbag 12 having a stored condition in which the airbag is deflated (e.g., flat), rolled and/or folded, and packaged in a housing in the side rest 40. The stored condition of the side airbag 12 is illustrated in FIG. 2. The side airbag 12 is inflatable to a deployed condition positioned between the occupant 50 and the side rest 40, as shown in FIG. 3B. In the deployed condition shown in FIGS. 3A and 4A, side airbag 12 can extend from adjacent or near the bottom cushion 34 upward to the upper surface 46 of the side rest 40 and inward towards the occupant 50 without breaking through the surface of the side rest and/or side cushion 42. In the deployed condition shown in FIG. 4B, side airbag 12 can extend from adjacent or near the bottom cushion 34 upward to the upper surface 46 of the side rest 40 and inward towards the occupant 50, breaking through the surface of the side rest and/or side cushion 42 towards the pelvis 56 and lower torso 52 of the occupant. In the deployed condition shown in FIGS. 3B and 4C, the side airbag 12 extends from adjacent or near the bottom cushion 34 upward, above the side rest 40 and can optionally cover the occupant's torso 52 and head 54.

The apparatus 10 includes an inflator 14 that is actuatable to provide inflation fluid for inflating the side airbag 12. The apparatus 10 can also include a housing or cover 16 for the side airbag 12 for packaging and protecting the side airbag in the stored condition. As shown in FIG. 2, the cover 16 can enclose the side airbag 12 in a manner that forms a small package that can be installed in the vehicle seat 30. The cover 16 can be configured to help direct the deployment path of the side airbag 12 so that it reaches the deployed condition in a repeatable and reliable manner.

As shown in the example configurations of FIGS. 3A-4C, the inflator 14 can be at least partially positioned inside the side airbag 12 so that inflation fluid discharged from the inflator enters the inflatable volume of the airbag. The rolled/folded side airbag 12 and the inflator 14 can be placed inside the cover 16 to form a packaged airbag module 120. In assembling the airbag module 120, mounting elements of the inflator 14, such as studs, can extend through overlying fabrics of the side airbag 12 and cover 16. Accordingly, connecting the inflator 14 to the seat frame 44 of the side rest 40 thereby connects the airbag module 120 to the side rest. Alternative connectors, such as anchor bolts, clamps, brackets, etc. can also be used to connect the airbag module 120 to the side rest 40 and/or the seat frame 44.

The cover 16 is configured to open in response to inflation and expansion of the side airbag 12. The cover 16 can, for example, include a weakened portion, such as a tear seam, that ruptures to permit airbag deployment. The side rest 40 and/or the side cushion 42 is/are also configured to open in response to inflation of the side airbag 12 so that the airbag can deploy from within the side rest. For this purpose, the side rest 40 can include a tear seam 18. In another aspect, the side rest 40 and/or the side cushion 42 is/are covered with an elastic material that can stretch in response to inflation of the side airbag 12 so that the airbag can deploy fully within the side rest.

As shown in FIG. 2, according to an example configuration, the tear seam 18 is positioned on an inner panel of the side rest 40, at a location proximal to an upper extent of the air bag module 120, which is secured to the seat frame 44. Alternative locations for the tear seam 18 could, however, be selected based on the configuration and position of the air bag module 120. For example, the air bag module 120 could have a configuration that dictates the tear seam being located at a different position on the side rest 40, on the side cushion 42, in the seat base 32, or on the back rest 38, for example, at or near the intersection of the side rest 40 and the back rest. In another example, the tear seam 18 can be positioned on an upper surface 46 of the side cushion 42 and/or side rest 40. Additionally, the seat 30 can include multiple tear seams 18 and/or the tear seam could be shaped or contoured differently from that shown in the figures.

Additionally, while the side airbag 12 is illustrated as extending from the bottom cushion 34 upward along the occupant's pelvis 56, thorax 52, and head 54, the airbag could have different configurations and extents. For example, the side airbag 12 could be configured as to work in concert with one or more additional airbags to provide complete occupant coverage. For instance, the side airbag 12 can be configured to cover the pelvis 56 and a lower portion of the occupant's thorax 52 in a system that includes an additional airbag, such as a curtain airbag, for covering the occupant from the upper extent of the side airbag to and above the occupant's head 54.

Figure 3A:
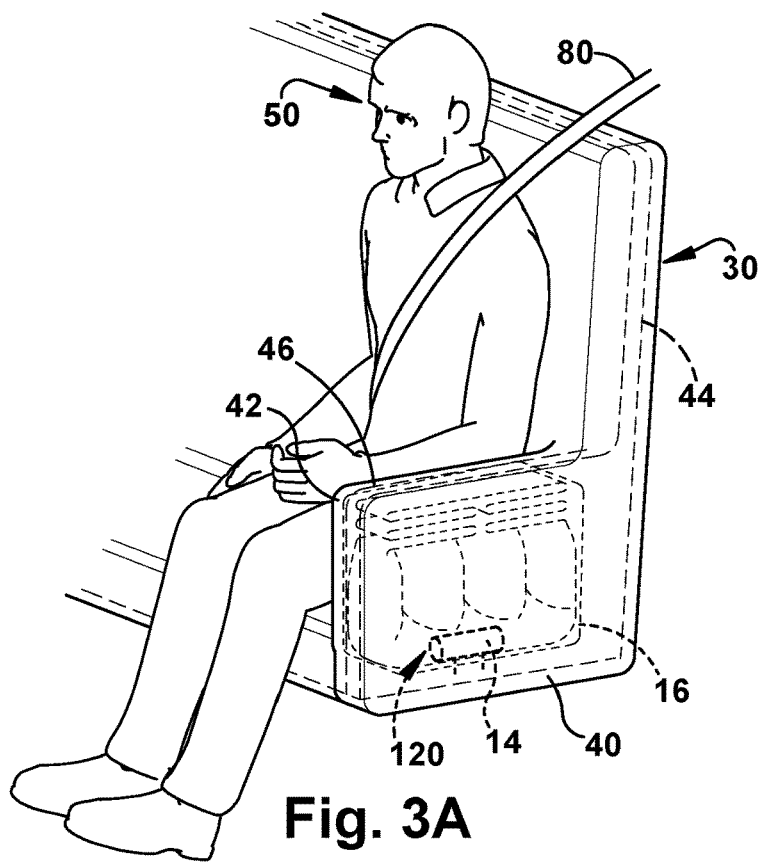
FIGS. 3A and 3B are schematic illustrations of the vehicle seat and the deployable restraint of the apparatus in deployed conditions.
Figure 3B:
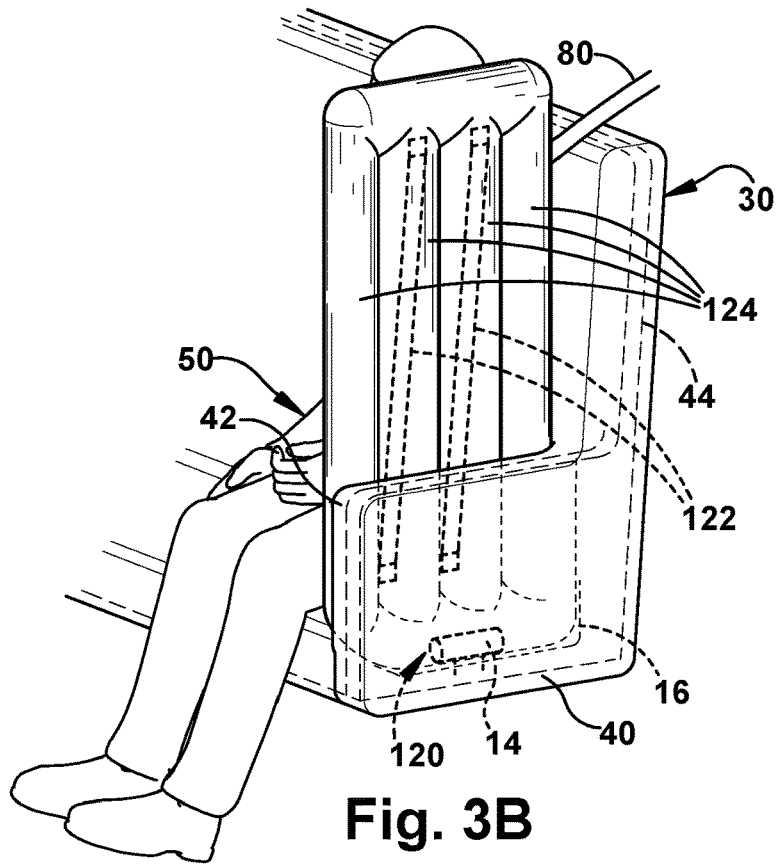

In the inflated and deployed condition, the side airbag 12 of the example configuration illustrated in FIGS. 3A and 3B has a generally rectangular/cuboid configuration with rounded edges. The side airbag 12 can also include internal connections, such as tethers 122 that interconnect panels of the airbag to limit its thickness and to define a series of parallel chambers 124. The shape of the chambers 124 need not, however, be parallel or uniform; the tethers 122 can be shaped to form chambers that are shaped and/or positioned to help optimize the protection afforded to the occupant 50. In FIG. 3A the side airbag 12 inflates within the confines of the cover of the side rest 40 and/or side cushion 42 to protect at least the pelvis 56 of the occupant 50. In FIG. 3B the side airbag 12 inflates to tear through the tear seam 18 on an upper surface 46 of the side rest 40 to protect at least the pelvis 56, thorax 52, and/or the head 54 of the occupant 50.

Figure 4A:
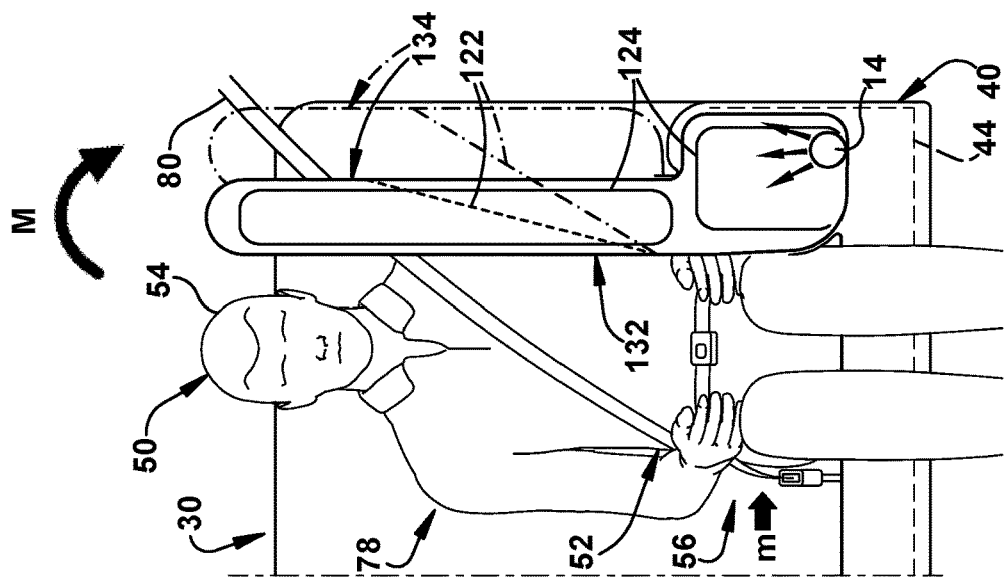
FIGS. 4A-4C are schematic illustrations of example configurations of the vehicle seat and the deployable restraint of the apparatus.
Figure 4B:
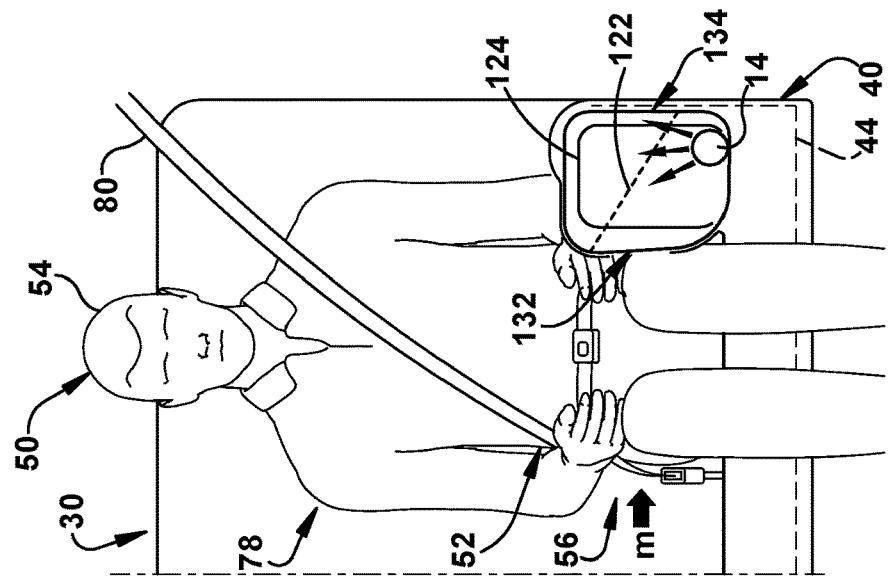
Figure 4C:
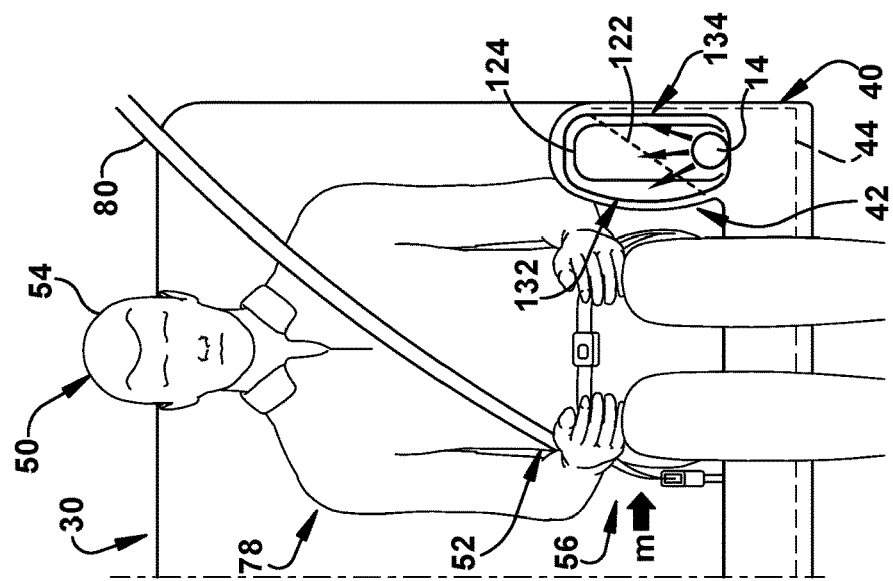

The side airbag 12, in the inflated and deployed conditions of FIGS. 4A-C, is positioned between the side rest 40 and the occupant 50. Depending on the configuration of the particular side airbag 12, which can depend on factors such as the vehicle architecture and whether the system includes other airbags that operate in combination with the side airbag, the extent of the side airbag can vary. The side airbag 12 of the example configurations shown in FIGS. 4A and 4B can cushion the upper legs 60 and the pelvis 56 from impacts with at least a portion of the side rest 40. The side airbag 12 of the example configuration shown in FIG. 4C can cushion the upper legs 60, pelvis 56, and thorax 52 from impacts with the side rest 40. The side airbag 12 of the example configuration shown in FIG. 4C can also cushion the thorax 52 and head 54 from impacts with adjacent vehicle structure, such as a door, window, pillar structure, etc. of the vehicle 20.

In the inflated and deployed condition, the side rest 40 and/or the seat frame 44 within the side rest act as a reaction surface that supports the side airbag 12 against the forces of the impacting and penetrating occupant 50. Structure positioned adjacent the vehicle seat 30, such as a door, window, pillar structure, etc., can also act as a reaction surface for the portions of the side airbag 12 engaging those structures.

The example configuration of the side airbag 12 in seat 30, deployed within the cover of the side rest 40, shown in FIG. 4A, could be implemented in a vehicle that includes additional side airbags configured to protect the thorax 52, shoulders 78, and head 56 of the occupant 50. The side airbag 12 can be positioned within the side rest 40 to deploy between the occupant 50 and the seat frame 44 and/or at least one hard surface of side rest 40. Advantageously, in this scenario, the side air bag 12 can be configured so that airbag pressurization, in combination with chamber 124 configuration results in a stiffness of the airbag sufficient to allow the side rest 40 and/or seat frame 44 to support and act as a reaction surface for, the entire airbag. At least one tether 122 can also act as a reaction surface for side airbag 12 and/or to keep the deployed airbag confined within the cover of the side rest 40. Occupant impact with portions of the side airbag 12, through a cover of the side rest 40, creates a force, indicated generally by the arrow labeled m in FIG. 4A, against an inboard panel 132 of the airbag to cause a portion of an outboard panel 134 of the airbag to push against at least a portion of the side rest 40 and/or the seat frame 44.

The example configuration of the side airbag 12 in seat 30, deployed through a tear seam 18 in the side rest 40, shown in FIG. 4B, could also be implemented in a vehicle that includes additional side airbags configured to protect the thorax 52, shoulders 78, and head 56 of the occupant 50. The side airbag 12 can be positioned within the side rest 40 to deploy between the occupant 50 and the seat frame 44 and/or at least one hard surface of side rest 40. The side airbag 12 can be pressurized to an extent necessary to break through tear seam 18. Advantageously, in this scenario, the side air bag 12 can be configured so that airbag pressurization, in combination with chamber 124 configuration results in a stiffness of the airbag sufficient to allow the side rest 40 and/or seat frame 44 to support and act as a reaction surface for, the entire airbag. At least one tether 122 can also act as a reaction surface for side airbag 12 and. The at least one tether 122 can also create a boundary of how far the inboard panel 132 of the airbag can extend towards occupant 50 on deployment. Occupant impact with portions of the side airbag 12 creates a force, indicated generally by the arrow labeled m in FIG. 4B, against an inboard panel 132 of the airbag to cause a portion of an outboard panel 134 of the airbag to push against at least a portion of the side rest 40 and/or the seat frame 44.

The example configuration of the side airbag 12 in seat 30, extending above the side rest 40 to adjacent the occupant's head 54, shown in FIG. 4C, could be implemented in a vehicle that lacks reaction surface structure adjacent those upper airbag portions extending above the side rest. Advantageously, however, in this scenario, the side air bag 12 can be configured so that airbag pressurization, in combination with chamber 124 configuration results in a stiffness of the airbag sufficient to allow the side rest 40 and/or seat frame 44 to support and act as a reaction surface for, the entire airbag. Additionally, the airbag 12 could be configured to have an increased thickness, indicated generally in dashed lines at 12' in FIG. 4C, forming an overlap portion 126 that engages an upper surface 46 of the side rest 40.

Occupant impact with portions of the side airbag 12 above the side rest 40 creates bending forces, indicated generally by the arrow labeled M in FIG. 4C, that cause an upper portion 128 of the side airbag to bend outboard of the vehicle seat 30 around the side rest 40. Occupant impact with portions of the side airbag 12 below the top of the side rest 40 creates a force m, pushing into the side rest. When this occurs, the overlap portion 126 can be configured to engage the upper surface 46 of the side rest 40 to block and resist the bending, thereby allowing the structure supporting a lower portion 130 of the airbag 12 to act as a reaction surface for the upper portion 128.

The pressurization of the side airbag 12 and the chamber configuration can be selected to facilitate and promote this function. For example, increased pressurization will increase the inflated stiffness of the airbag 12 and therefore increase the ability of the structure supporting the lower portion 130 of the airbag to act as a reaction surface for the upper portion 128. As another example, the connections or tethers 122 forming the airbag chambers 124 can be configured to help resist the bending of the upper portion 128 relative to the lower portion 130.

For instance, the airbag 12 can include a tether 122 that is connected at a first end to an inboard panel 132 of the airbag at or below the upper surface 46 of the side rest 40. The tether 122 can extend diagonally upward and outboard of the vehicle seat 30 and have a second end connected to an outboard panel 134 of the airbag at a location vertically above the side rest 40, e.g., in the area of the upper torso 52 or head 54 of the occupant 50. In this example configuration, bending of the upper portion 128 of the airbag 12 will exert tension on the diagonal tether 122. The lower, first end of the tether, being connected to the lower portion 130 of the airbag 12 in the area of the side rest 40, will resist displacement, as the lower portion of the airbag is supported by the side rest 40. The connection of the second end of the tether 122 to the outboard panel 134 of the upper airbag portion 128 allows the tensioned tether to resist bending movement of the upper portion. In this manner, the side airbag 12 can be configured to have the side rest 40 act as a reaction surface for the entire airbag, even the upper portion 128 extending above the side rest, and even in the absence of adjacent structure against which the upper portion can rest.

Figure 5:
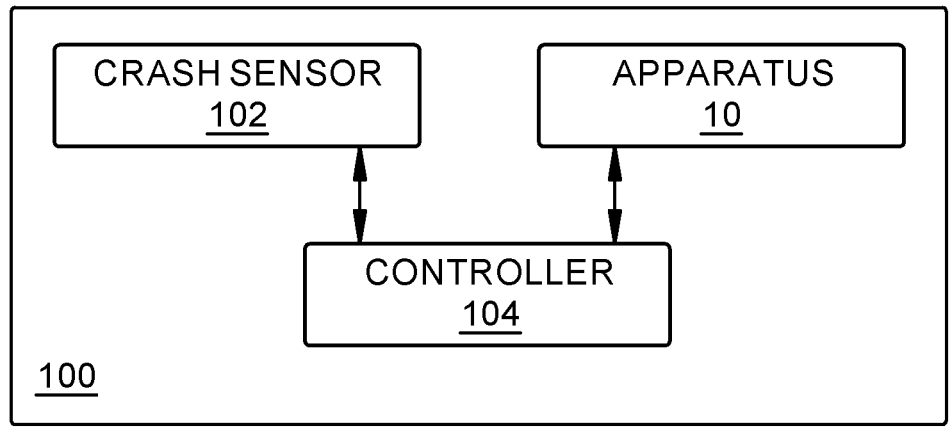
FIG. 5 is a schematic diagram showing an example of a system that can protect an occupant of a vehicle set in the event of a collision.

Referring to FIG. 5, the apparatus 10 can be implemented in a vehicle safety system 100 for helping to protect occupant(s) 50 of a vehicle seat 30 in the event of a collision. In addition to the apparatus 10, the system 100 can also include at least one crash sensor 102 for detecting a vehicle collision event, and a controller 104 for controlling actuation of the apparatus. The controller 104 can receive a signal from the at least one crash sensor 102 in response to a vehicle collision event and can actuate the inflator 14 to cause the side airbag 12 to inflate and deploy.

Figure 6:
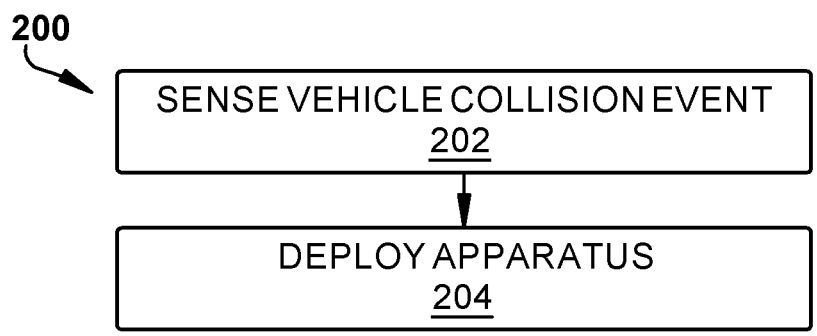
FIG. 6 is a process flow diagram showing methods for helping to protect can occupant of a vehicle in the event of a collision.

For the above, it will be appreciated that, in addition to apparatus 10 described herein, the invention also relates to a method for helping to protect an occupant of a vehicle seat in the event of a collision. FIG. 6 illustrates the method 200 as a process flow diagram with flow chart illustration. For purposes of simplicity, the method 200 is described as being executed serially; however, it is to be understood and appreciated that the present disclosure is not limited by the illustrated order, as some steps could occur in different orders and/or concurrently with other steps shown and described herein. Additionally, the method 200 can include steps in addition to those illustrated in FIG. 6.

The method 200 can be executed by hardware—for example, the method 200 can be performed primarily by the controller 104 of the system 100 of FIG. 5. One or more hardware elements of the controller 104 can execute software routine to implement at least a portion of the method. Additionally, one or more elements of the controller 104 can include a non-transitory memory (not shown) storing the software routines and one or more processors (not shown) to execute the software routines corresponding to at least a portion of the methods. Other components of the apparatus 10 and the system 100 of FIGS. 1-5 can also be used to facilitate the method.

Referring now to FIG. 6, the method 200 can include sensing the occurrence of a vehicle collision at step 202. This step 202 can be performed, for example, by the controller 104 using signals provided by the at least one crash sensor 102. The method 200 can also include step 204, which can deploy the apparatus 10 in response to the vehicle collision sensed at step 202, to protect the occupant(s) from impact with at least the side rest. The deployed apparatus 10 can also protect the occupants from impact with side structures of the vehicle 20. More specifically, step 204 includes inflating the airbag 14 using inflator 14 to protect the occupant from impact with at least one of the side rest 40, the side cushion 42, or side structures of the vehicle 20. The airbag 14 can be inflated within the confines of the side cushion 42 or can expand out of the side cushion/side rest 40 through a tear seam 18. The deployed airbag 14 can be configured to protect at least one of the pelvis 56, torso 52, the shoulder 78, the neck, and the head 54 of the occupant(s) 50.

From the above, description, those skilled in the art will perceive improvements, changes, and modifications. Such improvements, changes, and modifications are within the skill of one in the art and are intended to be covered by the appended claims.

The following is claimed:

1. An apparatus for helping to protect occupants of a vehicle seat in response to a vehicle collision, the vehicle seat including a base including a bottom cushion, a backrest including a back cushion, and a side rest that extends upward above the bottom cushion and forward of the back cushion, forming an upper surface configured to support an occupant's arm in a resting position, the apparatus comprising:

a side airbag having a stored, pre-deployment condition in the side rest, the side airbag being inflatable to a deployed condition in which the side airbag cushions the occupant against impacts with the side rest, the side airbag when in the deployed condition extending upward above the bottom cushion and forward of the back cushion, the side airbag comprising a lower portion configured to deploy between the side rest and the occupant and an upper portion configured to deploy above the side rest, adjacent the occupant; and at least one internal tether having a first end connected to an inboard panel in the lower portion of the side airbag and a second end connected to an outboard panel in the upper portion of the side airbag, the at least one tether extending between the inboard and outboard panels diagonally, wherein the at least one tether is configured so that the side rest acts as a reaction surface for resisting outboard bending movement of portions of the side airbag above the side rest.

2. The apparatus of claim 1, wherein the lower portion of the side airbag is configured to be stored flat in the side rest, the lower portion being configured to deploy inboard of the side rest without unfolding or unrolling.

3. The side airbag of claim 1, wherein the lower portion of the side airbag is a pelvic side airbag.

4. The apparatus of claim 1, wherein the lower portion of the side airbag when deployed is configured remain within confines of the side rest of the vehicle seat.

5. The apparatus of claim 1, wherein the upper portion of the airbag, when in the deployed condition, is configured to extend from the side rest upward to adjacent shoulders of the occupant.

6. The apparatus of claim 1, wherein the upper portion of the airbag, when in the deployed condition, is configured to extend from the side rest upward to adjacent a head of the occupant.

7. The apparatus of claim 1, wherein the side airbag is configured to deploy out of the side rest through an occupant-facing tear seam of the side rest.

8. The apparatus of claim 1, further comprising a cover for the side airbag, the cover comprising a heat protecting material.

9. The apparatus of claim 1, wherein the side airbag extends forward from the back cushion to a front edge of the bottom cushion.

10. The apparatus of claim 1, wherein the second end of the at least one tether is connected to the outboard panel at a location configured to be adjacent shoulders of the occupant.

11. The apparatus of claim 1, wherein the second end of the at least one tether is connected to the outboard panel at a location configured to be adjacent a head of the occupant.

12. The apparatus of claim 2, wherein the upper portion of the side airbag is configured to be stored in a folded and/or rolled condition in the side rest, the upper portion being configured to unfold and/or unroll when deploying upward of the side rest.

13. The apparatus of claim 1, further comprising connections interconnecting the inboard and outboard panels of the side airbag to define inflatable chambers of the airbag.

14. The apparatus of claim 13, wherein the connections and the inflatable chambers are vertically extending and parallel.

15. A system for helping to protect occupants of a vehicle seat in the event of a collision comprising:
the apparatus of claim 1;
an inflator for inflating the side airbag;
at least one crash sensor for detecting a vehicle collision event; and
a controller for receiving a signal from the at least one crash sensor in response to the vehicle collision event, wherein the controller is configured to actuate the inflator to deploy the side airbag in response to receiving the signal from the crash sensor.

16. A method for helping to protect occupants of a vehicle seat in the event of a collision comprising the steps of:
sensing the occurrence of a vehicle collision event; and
deploying the apparatus of claim 1 in response to the sensed vehicle collision to protect the occupants from impact with the side rest.

* * * * *